United States Patent Office 3,417,094
Patented Dec. 17, 1968

3,417,094
OPTICALLY ACTIVE 1,2,3,4,5,6-HEXAHYDRO-6-PHENYL - 2,6 - METHANO - 3 - BENZAZOCINES AND PROCESS
Martin Dexter, Briarcliff Manor, N.Y., assignor to Geigy Chemical Corporation, Greenburgh, N.Y., a corporation of Delaware
No Drawing. Filed May 5, 1965, Ser. No. 453,474
4 Claims. (Cl. 260—294.7)

ABSTRACT OF THE DISCLOSURE

Racemic d,l-1,2,3,4,5,6-hexahydro-2,6-methano-3-benzazocines are resolved through use of one-half equivalent of an optically active isomer of mandelic acid and one-half equivalent of an optically inactive carboxylic acid.

Detailed description

This invention relates to novel organic compounds with valuable pharmacological properties. More particularly, it relates to salts of optically active 2,6-methano-3-benzazocines, to processes for resolving racemic 2,6-methano-3-benzazocines into optically active isomers and to processes for preparing optically active 2,6-methano-3-benzazocines by cyclizing novel salts of optically active 1,2,5,6-tetrahydropyridines.

In the copending application of Frank H. Clarke, Jr., Ser. No. 322,063, filed Nov. 7, 1963, now U.S. Patent No. 3,320,265, and assigned to the assignee of the instant application, special mention is made of a valuable class of 1,2,3,4,5,6-hexahydro-6-phenyl - 2,6 - methano-3-benzazocine-8-ols of the formula:

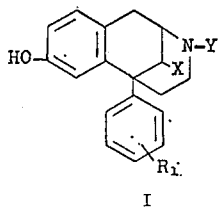

I wherein $R_1$ is hydrogen, halogen, (lower)alkyl, (lower)alkoxy, (lower)alkanoyloxy, hydroxy or trifluoromethyl;
X is hydrogen or (lower)alkyl; and
Y is hydrogen, (lower)alkanyl, Z-(lower)alkenylene or Z-(lower)alkylene wherein
Z is hydrogen, halogen, cycloalkyl, phenyl, halophenyl, nitrophenyl, hydroxyphenyl, aminophenyl, (lower)alkoxyphenyl, amino, alkylamino, dialkylamino, morpholino, hydroxy, (lower)alkoxy, (lower)alkanoyl or (lower)alkanoyloxy.

In the said copending application, there are also disclosed certain 1,2,5,6-tetrahydropyridines of the formula:

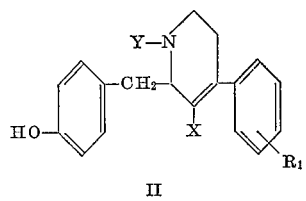

II wherein $R_1$, X and Y are as above defined.
By the term "(lower)alkyl" and derivatives thereof such as "(lower)alkoxy," "(lower)alkanoyloxy," "(lower)alkenyl" and the like is intended a group comprising a branched or straight hydrocarbon chain containing from one to six carbon atoms. Representative of (lower)alkyl groups are thus methyl, ethyl, propyl, i-propyl, butyl, s-butyl, pentyl, isopentyl, hexyl and the like. Embraced by (lower)alkoxy are groups containing from one to six carbon atoms and joined through an oxygen ether bond such as methoxy, ethoxy, i-propoxy, butoxy and the like. It is to be understood that when the nature of any particular functional group in these substituents, such as an olefinic bond in an alkenyl group, requires two carbon atoms, the hydrocarbon portion of the group will have from two to seven carbon atoms. Thus "(lower)alkanoyloxy" is typified by acetoxy, propanoyloxy, butanoyloxy, pentanoyloxy, hexanoyloxy, and the like while representatives of the term "lower alkenyl" includes vinyl, allyl, 2-methyl-2-butenyl, isopropenyl, 1,3-butadienyl, 2-pentyl and the like.

X may be hydrogen or (lower)alkyl, preferably methyl, although any alkyl group of from one to six carbon atoms as described above is embraced.

The group Y may be hydrogen or a substituent of an essentially hydrocarbon nature. For example, Y may be (lower)alkyl; (lower)alkenyl, such as vinyl, allyl, 2-propenyl, 2-isopentenyl and the like; or (lower)alkynyl, such as ethnyl, propynyl and the like. In addition, Y may be a substituted (lower)alkyl group in which one hydrogen atom of the alkyl group is replaced by a substituent such as cycloalkyl of from three to six carbon atoms, as for example, cyclopropyl, cyclobutyl, cyclopentyl; phenyl including substituted phenyl such as chlorophenyl, iodophenyl, bromophenyl, nitrophenyl, aminophenyl, (lower)alkoxyphenyl, hydroxyphenyl and the like; amino including mono and dialkylamino and cycloalkylamino groups; hydroxy, (lower)alkoxy or (lower)alkanoyloxy. Examples of these substituted (lower)alkyl groups are thus cyclopropylmethyl, phenylethyl, 3,4-dichlorobenzyl, 4-aminophenethyl, methylaminopropyl, 2-piperidinylethyl, 2-ethoxyethyl, 2-hydroxyethyl, 2-acetoxyethyl and the like. Also encompassed within the scope of Y are substituted (lower)alkenyl such as phenyl (lower)alkenyl, halo(lower)alkenyl, e.g., 3-chloroallyl, 2-bromo-2-propenyl, 3-chloro-2-butenyl, 2,3,3-trichloro-2-propenyl. Thus Y may be defined as being hydrogen, alkenyl, phenyl(lower)alkenyl, (lower)alkynyl or Z-alkylene wherein Z is hydrogen, cycloalkyl, phenyl, halophenyl, nitrophenyl, aminophenyl, (lower)alkoxyphenyl, hydroxyphenyl, as well as polysubstituted phenyl, amino, alkylamino, dialkylamino, (lower)alkoxy, (lower)alkanoyloxy and the like.

It is to be noted that the system of nomenclature used herein is different from that employed in the said previous Clarke application. It is believed that the present system is in more strict conformance with preferred practice.

As is specifically taught in the said copending application, the novel compounds of Formulae I and II herein have valuable pharmacological properties. In particular, some are non-toxic analgesics (anti-pain agents) having an activity of the same order of magnitude as morphine. Certain others are valuable antitussive (anti-cough) agents. And, the particular area of utility appears to be distinctly related to the optical activity of the compounds. Thus, for Formula I the dextrorotatory-(+)-antipodes are useful primarily as antitussives and the levorotatory-(−)-antipodes are useful primarily as analgesics. A comparable separation of properties occurs with compounds of Formula II. Because the synthetic procedures for preparing compounds of Formulae I and II lead to racemic mixtures, that is, optically inactive mixtures of dextrorotatory and levorotatory antipodes, it is most desirable to provide a means to separate the mixture into the pure optically active antipodes, each substantially free of the other. Processes for splitting racemates are known in the art as "resolution" processes, and a superior means to resolve racemic compounds of Formulae I and II is the subject of this invention.

Also contemplated by the instant invention is a particularly valuable means to obtain pure optical isomers of the desired 2,6-methano-3-benzazocines. This involves cyclization directly of the instant optically active intermediate 1,2,5,6-tetrahydropyridines (II) obtained according to the methods taught herein. Such a direct cyclization process provides the desired optically active 2,6-methano-3-benzazocine more economically since any loss in yield during resolution occurs with the less expensive tetrahydropyridine.

The instant invention, in essence, contemplates a process which comprises treating a racemic, d,l-1,2,3,4,5,6-hexahydro-2,6-methano-3-benzazocine of the formula:

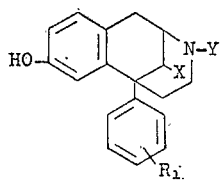

wherein $R_1$, X and Y are as above defined, or an acid addition salt thereof,
with an optically active mandelic acid comprising L-(+)-mandelic acid or L-(−)-mandelic acid to form a mixture of optically active salts and separating from said mixture a salt of an optically active 1,2,3,4,5,6-hexahydro-2,6-methano-3-benzazocine with the said mandelic acid.

This invention also contemplates as novel compositions of matter the said optically active addition salts of compounds of Formula I with optically active mandelic acid. And, as will be obvious to those skilled in the art, each of the said 2,6-methano-3-benzazocines can form four salts within the scope of this invention. For example, and as will be illustrated hereinafter, 1,2,3,4,5,6-hexahydro-3-methyl-6-phenyl-2,6-methano-3-benzazocine-8-ol with D-(−)-mandelic acid forms a mixture of acid addition salts comprising the dextrorotatory-(+)-2,6-methano-3-benzazocine D-(−)-mandelate and the levorotatory-(−)-2,6-methano-3-benzazocine D-(−)-mandelate and with L-(+)-mandelic acid, it forms a mixture of acid addition salts comprising the dextrorotatory-(+)-2,6-methano-3-benzazocine L-(+)-mandelate and the levorotatory-(−)-2,6-methano-3-benzazocine L-(+)-mandelate. The optically active pairs are separable, one from another, by taking advantage of their differences in solubility and after recovering each salt, for example, by separating that which crystallizes first and recovering the other from the mother liquor, the optically active benzazocine is recovered by rendering a solution of the salts basic, for instance by treating it with ammonia or sodium carbonate, and removing the basic benzazocine, which separates.

Also contemplated by the instant invention is an embodiment comprising a process for separating racemic benzazocines of Formula I which comprises treating said racemic compound with one-half equivalent of an optically inactive organic carboxylic acid and with one-half equivalent of L-(+)-mandelic acid or D-(−)-mandelic acid to form a mixture of optically active salts and separating from said mixture a salt of an optically active compound of Formula I. Such an embodiment is distinctly advantageous because it permits the replacement of at least one-half of the very expensive optically active mandelic acid with an inexpensive optically inactive acid. The optically inactive acid can be selected from a broad range of compounds, although it is preferred to select those which are liquids and have an appreciable solubility in the solvents commonly employed in fractional crystallization. Especially useful are (lower)-alkanoic acids such as acetic, propionic, butanoic and the like.

The instant invention contemplates also a process which comprises treating a racemic, d,l-1,2,5,6-tetrahydropyridine of the formula

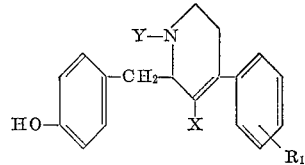

wherein $R_1$, X and Y are as above defined.

with an optically active L-(+)-mandelic acid or D-(−)-mandelic acid to form a mixture of optically active salts and separating from said mixture of salt of an optically active 1,2,5,6-tetrahydropyridine with said acid.

This invention also contemplates as novel compositions of matter the said optically active addition salts of compounds of Formula II with optically active mandelic acid. And, as explained hereinabove in connection with the salts of 2,6-methano-3-benzazocines, four isomeric salt pairs can be found from each of the 1,2,5,6 - tetrahydro pyridines within the scope of Formula II and all of these are contemplated herein.

As is specifically mentioned above, there is also contemplated a process for obtaining optically active isomers of benzazocines of the formula:

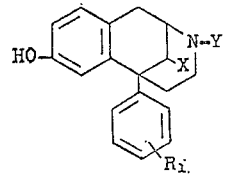

wherein $R_1$, X and Y are as above defined.

which comprises treating a 1,2,5,6-tetrahydropyridine of the formula:

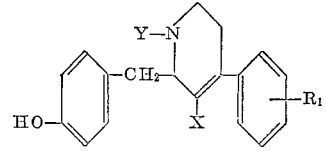

or an acid addition salt thereof, with a Lewis acid cyclizing agent and recovering the said optically active benzazocine isomer. This process affords economic advantages as noted above.

Lewis acids which are employed in the ring closure of compound of Formula II include for example mineral acids such as phosphoric acid, sulfuric acid, hydrohalic acids, e.g. hydrobromic acid, as well as aluminum bromide, aluminum chloride, zinc chloride, titanium chloride, iron chloride, boron trifluoride and the like.

The reaction is generally executed at elevated temperatures such as at the reflux temperature of the reaction mixture. Generally an excess of the mineral acid is utilized when this is the cyclization reagent. In the case of aluminum chloride, aluminum bromide and similar Lewis acids, an inert solvent such as carbon disulfide is advantageously utilized.

Special mention is made of a particularly valuable embodiment of the cyclization process. This involves using as a starting material, the 1,2,5,6-tetrahydropyridine wherein Y represents a methyl group. This affords an optically active benzazocine from which the methyl group can be removed and replaced with hydrogen. This compound then may be converted by the processes described in the said copending Clarke application, Ser. No. 322,063, filed Nov. 7, 1963, now U.S. Patent No. 3,320,265 to optically active benzazocines of Formula I hereinabove wherein Y is as broadly defined hereinabove.

The starting materials for preparing the instant compounds of Formulae I and II are readily obtained following the procedures outlines in detail in the said Clarke application. Optically active D-(—)-mandelic acid and L-(+)-mandelic acid, also known as α-hydroxyphenylacetic acids, are freely available items of commerce. The techniques for separating the instant optically active addition salts into their optically active free base antipodes; for recovering them; and for converting them to their useful acid addition salts will be fully exemplified hereinafter.

Special mention is made of a uniquely advantageous technique made available by the instant invention. This involves racemization of an optically active salt of a 1,2,5,6-tetrahydropyridine of Formula II, *after* its optically active antipode has been separated therefrom, and then resolving the racemic 1,2,5,6-tetrahydropyridine in accordance with the novel processes herein. In some cases the demand for one of the antipodes of the benzazocines of Formula I may exceed that for the other. In this event, there is the tendency for the optically active 1,2,5,6-tetrahydropyridine of Formula II not useful to prepare the demanded benzazocine, to accumulate. It is found possible to racemise this accumulated tetrahydropyridine, for example, by treatment with strong alkali such as potassium hydroxide; to resolve the racemate with optically active mandelic acid; to separate the desired optically active salt of the compound of Formula II; and to cyclize it by means taught herein.

The following examples are given solely for the purpose of illustrating this invention and are not to be construed as limitations thereof, many apparent variations of which are possible without departing from the spirit or scope thereof.

Example 1.—Resolution of d,l-1,2,3,4,5,6-hexahydro-3-methyl-6-phenyl-2,6-methano-3-benzazocine-8-ol A solution of 43.94 g. (0.158 mole) of racemic, d,l,1,2,3,4,5,6 - hexahydro - 3 - methyl - 6 - phenyl - 2,6 - methano-3-benzazocine-8-ol, prepared as described in Example 1 of the patent application of Frank H. Clarke, Jr., Ser. No. 322,063, filed Nov. 7, 1963, and 24.04 g. (0.158 mole) of L-(+)-mandelic acid in 1250 ml. of methanol and 500 ml. of isopropanol is concentrated to a volume of 700 ml. During the process the diastereometric levorotatory acid addition salt precipitates as a white solid. After cooling the mixture, the salt is collected by filtration to afford 27.84 g. (82% of theory) of product, M.P. 223–237° C., $[\alpha]_D^{20}=-13.5°$ (C=1.0, R=2 dcm., methanol). The optically active levorotatory free base in liberated by partially dissolving the salt in 250 ml. of boiling water and adding 75 ml. of 5% aqueous ammonia. Upon cooling, the product is collected to give 18.0 g. of white crystals, M.P. 263–271° C. One recrystallization from n-butanol gives 11.8 g. (61% yield), M.P. 267–273° C., $[\alpha]_D^{20}=-92.4\pm1.5°$ (C=0.66, l=1 dcm., methanol).

The dextrorotatory mandelic acid salt and the corresponding free base is isolated from the mother liquor above by concentrating it to 300 ml. and cooling the concentrate whereupon the salt is deposited, M.P. 187.5–189° C. The mandelic acid addition salt is treated with aqueous ammonia solution to liberate the free base, 23.35 g., M.P. 255° C. Recrystallization from n-butanol affords dextrorotatory product as prisms, M.P. 274–278° C., 18.20 g., $[\alpha]_D^{26}=+85°$ (C=0.623, l=2 dcm., methanol).

Example 2.—Dextrorotatory-1,2,3,4,5,6-hexahydro-3-methyl-6-phenyl-2,6-methano-3-benzazocine-8-ol A mother liquor, prepared as described in Example 1, is evaporated to dryness to give a solid residue weighing 39.7 g. The solid is partially dissolved in 300 ml. of boiling water and 150 ml. of 5% aqueous ammonia is added to liberate the dextrorotatory free base.

A solution of 25.1 g. (0.09 mole) of the base and 13.70 g. (0.09 mole) of D-(—)-mandelic acid in 1250 ml. of methanol and 500 ml. of isopropanol is concentrated to a volume of 700 ml. The solid which forms on cooling, the optically active acid addition salt of d-1,2,3,4,5,6 - hexahydro- - 3 - methyl - 6 - phenyl - 2,6 - methano-3-benzazocine-8-ol with D-(—)-mandelic acid, is collected and dried to give 23.1 g., 70% yield, M.P. 237–40° C.

The salt is partially dissolved in 400 ml. of boiling water and 100 ml. of 5% aqueous ammonia is added to liberate the dextrorotatory base. Upon cooling, the product is collected and recrystallized from n-butanol to afford 11.36 g., 52% yield.

Example 3.—Resolution of d,l,3,11-dimethyl-1,2,3,4,5,6-hexahydro-6-phenyl-2,6-methano-3-benzazocine-8-ol Example 3.—Resolution of d,1-3,11-dimethyl-1,2,3,4,5,6-4,5,6 - hexahydro - 6 - phenyl - 2,6 - methano - 3 - benzazocine-8-ol, prepared as described in Example 25 of U.S. application Ser. No. 322,063, in 100 ml. of absolute alcohol is added 1.52 g. of L-(+)-mandelic acid with stirring and heating to obtain a clear solution. The solution, after standing at room temperature deposits white needles of the acid addition salt of levorotatory 3,11-dimethyl-1,2,3,4,5,6 - hexahydro - 6 - phenyl - 2,6 - methano - 3 - benzazocine-8-ol with L-(+)-mandelic acid, 1.78 g., M.P. 223–7° C. Recrystallization of the crystals from absolute methanol raises the melting point to 226–8° C. $[\alpha]_D^{26}=-38°$.

The mandelate salt is treated with aqueous ammonia and either to liberate the free base. The ether extract is washed with water, dried over anhydrous sodium sulfate and concentrated to deposit colorless prisms, M.P. 198–9° C. $[\alpha]_D^{28}=-113°$ C, 0.81, 1=dcm., methanol).

The mother liquor, about 100 ml., is concentrated to about one-half volume, then is allowed to stand to deposit colorless prisms of the acid addition salt of dextrorotatory 3,11 - dimethyl - 1,2,3,4,5,6 - hexahydro - 6 - phenyl - 2,6-methano-3-benzazocine-8-ol with L-(+)-mandelic acid, 1.62 g., M.P. 227–233° C. Recrystallization from absolute ethanol raises the melting point to 235–238° C., $[\alpha]_D^{28}=+118°$ (C, 1.015, MeOH).

The dextrorotatory free base is liberated and recovered by the above procedure for the levorotatory base. There are obtained colorless prism, M.P. 196–197° C., $[\alpha]^{28}=+127°$ (C, 1.05, l=1 dcm., methanol).

The above resolution procedure is repeated substituting an equal weight of D-(—)-mandelic acid for the L-(+)-mandelic acid. There is obtained the acid addition salt of dextrorotatory 3,11 - dimethyl - 1,2,3,4,5,6-hexahydro-6-phenyl-2,6-methano-3-benzazocine-8-ol with D-(—)-mandelic acid, 1.78 g., M.P. 223–7°. After recrystallization from absolute ethanol, the melting point is 226–8° C., $[\alpha]_D^{26}=+47°$ (C=1.23, MeOH).

The mother liquor is concentrated and deposits the acid addition salt of levorotatory 3,11-dimethyl-1,2,3,4,5,6-hexahydro - 6 - phenyl - 2,6 - methano - benzazocine - 8-ol with D-(—)-mandelic acid, M.P. 235–238° C., $[\alpha]_D^{28}=-118°$ (C=1.05, MeOH).

The procedure is repeated, substituting for the free base, the hydrochloric acid addition salt of d,l-3,11-dimethyl-1,2,3,4,5,6 - hexahydro - 6 - phenyl - 2,6 - methano - 3-benzazocine-8-ol, on a stoichiometrically equivalent basis. Substantially the same results are obtained; the free base antipodes are obtained in good yield.

Both of these optically active antipodes are converted to their physiologically active free base form with ammonia as described above, and to their valuable acid addition salts with pharmaceutically-acceptable non-toxic acids.

Example 4.—Resolution of d,l-2-(p-hydroxy)benzyl-1,3-dimethyl-4-phenyl-1,2,5,6-tetrahydropyridine Racemic 2-(p-hydroxy)benzyl-1,3-dimethyl-4-phenyl-1,2,5,6-tetrahydropyridine, prepared by treating the corresponding methoxy compound of Example 1 of application Ser. No. 322,063 for 10 minutes with 48% hydrobromic acid at reflux, rendering the mixture alkaline and recovering said phenolic pyridine, 2.39 g., and 1.52 g. of D-(—)-mandelic acid is dissolved in 70 ml. of isopropanol by heating. The solution, after being allowed to stand at room temperature for 48 hours, has deposited 1.43 g. of colorless prisms of the addition salt of 2-(p-hydroxy)benzyl - 1,3 - dimethyl - 4 - phenyl - 1,2,5,6 - tetrahydropyridine with D-(—)-mandelic acid, M.P. 182–190°, $[\alpha]_D^{27} = -37°$ (C, 1.61; MeOH).

The mandelate salt is treated with ammonia and ether. The ether layer is separated, dried over anhydrous sodium sulfate and evaporated to dryness. The residue is recrystallized from n-hexane to give colorless leaflets, M.P. 106–8° C. The dextrorotatory product has the rotation, $[\alpha]_D^{28} = +23°$ (C, 2.38; MeOH).

The procedure is repeated substituting an equal weight of L-(+)-mandelic acid for the D-(—)-mandelic acid. There are obtained the corresponding diastereomeric salts of levorotatory 2 - (p - hydroxy)benzyl - 1,3 - dimethyl - 4-phenyl-1,2,5,6-tetrahydropyridine with L-(+)-mandelic acid. These are separated by fractional crystallization in isopropanol; converted to the optically active free bases with ammonia; and then to the acid addition salts as decribed above.

Example 5.—Cyclization of dextrorotatory 2-(p-hydroxy) benzyl-1,3-dimethyl-4-phenyl-1,2,5,6-tetrahydropyridine Two hundred milligrams of the dextrorotatory free base prepared according to the procedure of Example 4 is dissolved in 1.0 ml. of 47% hydrobromic acid and the mixture is refluxed for 20 hours. The solution is cooled, quenched with ice and ammonium hydroxide solution and extracted with chloroform. The chloroform solution is evaporated to dryness, leaving as a residue, levorotatory 3,11 - demethyl - 1,2,3,4,5,6 - hexahydro - 6 - phenyl - 2,6 - methano-3-benzazocine-8-ol, M.P. 190–5° C., 70 milligrams (35% yield), with valuable physiological properties.

Example 6.—Racemization of levorotatory 2-(p-hydroxy) benzyl-1,3-dimethyl-4-phenyl-1,2,5,6-tetrahydropyridine One hundred and eighty-five milligrams of levorotatory free base prepared by working up the mother liquor of Example 4 is dissolved in 10 ml. of absolute ethanol and 86 mg. (20% excess) of potassium t-butoxide is added to the mixture. After 16 hours of reflux, the mixture is concentrated and the racemized product is extracted with chloroform and evaporation of the chloroform provides racemic d,l-2-(p-hydroxy)benzyl-1,3-dimethyl-4-phenyl-1,2,5,6-tetrahydropyridine.

The racemic 1,2,5,6-tetrahydropyridine is resolved with L-(+)-mandelic acid and the dextrorotatory free base is obtained by treatment with ammonia as described in Example 4. The dextrorotatory free base is cyclized by the procedure of Example 5 to provide 3,11-dimethyl-1,2,3,4,5,6 - hexahydro - 6 - phenyl - 2,6 - methano - 3 - benzazocine-8-ol.

Example 7.—Resolution of racemic, d,l-3,11-dimethyl-1,2,3,4,5,6 - hexahydro - 6 - phenyl - 2,6 - ethano - 3 - benzazocine-8-ol with acetic acid-mandelic acid combination Racemic 3,11-dimethyl-1,2,3,4,5,6-hexahydro-6-phenyl-2,6-methano-3-benzazocine-8-ol, 58.7 g., 0.2 mole, is suspended in 450 ml. of absolute methanol and the mixture is heated to 50–75° C. with stirring. Acetic acid, 6.0 g., 0.1 mole, in 25 ml. of ethanol is then added, followed by 15.2 g., 0.1 mole, of L-(+)-mandelic acid as the solid. The reagents are rinsed in with 75 ml. of ethanol. As soon as the L-(+)-mandelic acid is added, complete solution occurs. The clear, light yellow solution is held at 60–70° C. for a few minutes then cooled slowly with stirring to room temperature. Precipitation of the product begins at about 65° C.; after about 10 minutes if the solution is cooled from 75° C., after about 1 minute if the solution is initially at 60–65° C. The precipitated crystalline product is filtered, washed with ethanol, and dried in a vacuum to a constant weight. The yield of product is 38.4 g. (86% of theory), M.P. 220–223° C. (decomp.), $[\alpha]_D^{27} = -2.5°$ (c.=1.4; MeOH). Recrystallization of 18.4 g. from 350 ml. of 92% ethanol (by volume) yields 11.7 g. pure levorotatory 3,11-dimethyl-1,2,3,4,5,6 - hexahydro - 6 - phenyl - 2,6 - methano - 3 - benzazocine L-(+)-mandelic acid addition salt, M.P., 227–228° C. (decomp.), $[\alpha]_D^{28} = -41°$ (c.=1.78; MeOH).

Example 8.—Resolution of racemic, d,l-1,2,3,4,5,6-hexahydro-6-phenyl-2,6-methano-3-benzazocine-8-ols The following racemic, d,l-1,2,3,4,5,6-hexahydro-6-phenyl-2,6-methano-3-benzazocine-8-ols, prepared in accordance with the examples of U.S. Ser. No. 322,063, filed Nov. 7, 1963, are resolved in accordance with the procedure of Example 1 herein:

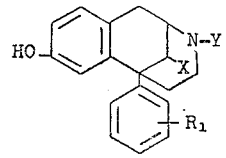

| $R_1$ | X | Y |
|---|---|---|
| p-Cl | H | $CH_3$ |
| H | H | H |
| p-Cl | H | H |
| H | H | $CH_2CH=CH_2$ |
| H | H | $CH_2C\equiv CH$ |
| H | H | $CH_2-CH=C(CH_3)_2$ |
| H | H | $CH_2CH=CHCl$ |
| H | H | $CH_2CH_2C_6H_5$ |
| H | H | $CH_2CH_2C_6H_4NH_2-(p)$ |
| H | H | $CH_2-\overline{CH-CH_2-CH_2}$ |
| H | H | $CH_2-CH=CH-C_6H_5$ |
| H | $CH_3$ | $CH_2CH_2C_6H_5$ |
| H | H | $CH_2(CH_2)_3CH_3$ |

There are obtained the optically active addition salts of the above listed benzazocines with D-(—)-mandelic acid and with L-(+)-mandelic acid.

Example 9.—Resolution of racemic, d,l-1,2,5,6-tetrahydropyridines

The procedure of Example 4 is used to resolve the following 1,2,5,6-tetrahydropyridines, prepared in accordance with the techniques of U.S. Ser. No. 322,063, filed Nov. 7, 1963:

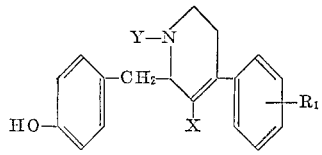

| $R_1$ | X | Y |
|---|---|---|
| p-Cl | H | $CH_3$ |
| H | H | H |
| p-Cl | H | H |
| H | H | $CH_2CH=CH_2$ |
| H | H | $CH_2C\equiv CH$ |
| H | H | $CH_2CH=C(CH_3)_2$ |
| H | H | $CH_2CH=CHCl$ |
| H | H | $CH_2CH_2C_6H_5$ |
| H | H | $CH_2CH_2C_6H_4NH_2-(p)$ |
| H | H | $CH_2-\overline{CH-CH_2CH_2}$ |
| H | H | $CH_2-CH=CH-C_6H_5$ |
| H | $CH_3$ | $CH_2CH_2C_6H_5$ |
| H | H | $CH_2(CH_2)_3CH_3$ |

There are obtained the optically active addition salts of the above listed benzazocines with D-(—)-mandelic acid and with L-(+)-mandelic acid.

Example 10.—Cyclization of optically active 1,2,5,6-tetrahydropyridines

The procedure of Example 5 is used to cyclize, with 48% hydrobromic acid, the optically active 1,2,5,6-tetrahydropyridines of Example 9 to the optically active isomers of the 1,2,3,4,5,6-hexahydro-2,6-methano-3-benzazocine-8-ols tabulated in Example 8.

The cyclization is carried out by an alternative procedure using the Lewis acid, aluminum tribromide: A suspension of 4.0 g. of the respective optically active 1,2,5,6-tetrahydropyridine (as the hydrochloride salts) in 25 ml. of carbon disulfide is stirred with cooling and to this suspension is slowly added 12 g. of aluminum tribromide in 50 ml. of carbon disulfide. Upon completion of the addition, the reaction mixture is stirred at reflux for 30 minutes and then permitted to cool. The solvent is decanted and the residue is added to an excess of aqueous ammonia in ice and chloroform with stirring. The chloroform layer is separated, dried over sodium sulfate and evaporated. The residue is triturated with ether and the resulting ethereal solution is filtered and evaporated to yield the corresponding optically active 1,2,3,4,5,6-hexahydro-6-phenyl-2,6-methano-3-benzazocines.

Example 11.—Resolution of racemic, d,l-1,2,3,4,5,6-hexahydro-6-phenyl - 2,6 - methano-3-benzazocine-8-ols with optically inactive carboxylic acid-optically active mandelic acid combinations The procedure of Example 7 is repeated substituting for the ½ equivalent of acetic acid a stoichiometrically-equivalent amount of the following optically in active acids: propionic, hexanoic, octanoic, dodecanoic, oxalic, succinic, sebacic, benzoic, p-toluenesulfonic and citric. Substantially the same results are obtained. The procedure of Example 7 repeated with the 2,6-methano-3-benzazocines-8-ols of Example 8 and the hydrochloric acid, phosphoric acid, maleic acid, and methane sulfonic acid addition salts thereof. The corresponding optically active 2,6-methano-3-benzazocines are obtained.

What is claimed is:
1. A process which comprises treating a compound selected from the group consisting of (a) a racemic, d,l-1,2,3,4,5,6-hexahydro-2,6-methano-3-benzazocine of the formula:

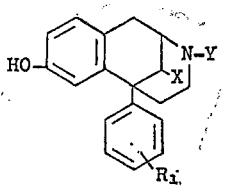

wherein $R_1$ is selected from the group consisting of hydrogen, halogen, (lower)alkyl, (lower)alkoxy, (lower)alkanoyloxy, hydroxy and trifluoromethyl;
X is a member selected from the group consisting of hydrogen and (lower)alkyl; and
Y is a member selected from the group consisting of hydrogen, (lower) alkynyl, Z-(lower)alkenylene and Z-(lower)alkylene wherein Z is a member selected from the group consisting of hydrogen, halogen, cycloalkyl, phenyl, halophenyl, nitrophenyl, hydroxyphenyl, aminophenyl, (lower)alkoxyphenyl, amino, alkylamino, dialkylamino, morpholino, hydroxy, (lower)alkoxy, (lower)alkanoyl and (lower)alkanoyloxy, and
(b) acid addition salts thereof,
with about one-half equivalent of an optically inactive organic carboxylic acid and with about one-half equivalent of an optically active mandelic acid selected from the group consisting of L-(+)-mandelic acid and D-(—)-mandelic acid to form a mixture of optically active and inactive salts and separating from said mixture a salt of optically active 1,2,3,4,5,6-hexahydro - 2,6 - methano-3-benzazocine with said mandelic acid.

2. A process as defined in claim 1 wherein $R_1$ is hydrogen, X is hydrogen and Y is methyl.

3. A process as defined in claim 1 wherein $R_1$ is hydrogen, X is methyl and Y is methyl.

4. In the process of resolving a compound of the formula

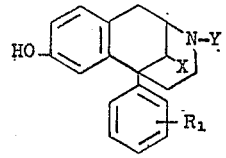

wherein $R_1$ is hydrogen, halogen, (lower)alkyl, (lower)alkoxy, (lower)alkanoyloxy, hydroxy or trifluoromethyl,
X is hydrogen or (lower)alkyl; and
Y is hydrogen, (lower)alkynyl, Z-(lower)alkenylene, or Z-(lower)alkylene, wherein Z is hydrogen, halogen, cycloalkyl, phenyl, halophenyl, nitrophenyl, hydroxyphenyl, aminophenyl, (lower)alkoxyphenyl, amino, alkylamino, dialkylamino, morpholino, hydroxy, (lower)alkoxy, (lower)alkanoyl, or (lower)alkanoyloxy, or
the acid addition salts thereof, through treatment thereof with either L-(+)-mandelic acid or D-(—)-mandelic acid, the improvement which comprises using one-half the equivalent amount of the mandelic acid and one-half the equivalent amount of an optically inactive carboxylic acid.

References Cited

May et al., J. Org. Chem., 24, p. 294 (1959).
Fieser et al., Adv. Org. Chem., pp. 85–88, Reinhold (1961).

HENRY R. JILES, *Primary Examiner.*

ROBERT T. BOND, *Assistant Examiner.*

U.S. Cl. X.R.

260—293, 247.5, 240, 247.2; 167—65

UNITED STATES PATENT OFFICE
CERTIFICATE OF CORRECTION

Patent No. 3,417,094

December 17, 1968

Martin Dexter

It is certified that error appears in the above identified patent and that said Letters Patent are hereby corrected as shown below:

Column 1, line 49, "alkanyl" should read -- alkynyl --. Column 6, lines 14 and 15, "Example 3.-Resolution of d,l-3,11-dimethyl-1,2,3,4,5,6-4,5,6-hexahydro-" should read -- To a warm solution of d,l-3,11-dimethyl-1,2,3,4,5,6-hexahydro --; line 43, "prism" should read -- prisms --. Column 7, line 34, "demethyl" should read -- dimethyl --; line 58, "ethano" should read -- methano --; line 64, "50-75° C" should read -- 60-75° C --. Column 9, line 25, "in active" should read -- inactive --.

Signed and sealed this 17th day of March 1970.

(SEAL)
Attest:

Edward M. Fletcher, Jr.
Attesting Officer

WILLIAM E. SCHUYLER, JR.
Commissioner of Patents